Nov. 16, 1954  J. PERRIN  2,694,491
APPARATUS FOR SENSING DATA RECORDED ON STATISTICAL RECORDS
Original Filed May 9, 1951  5 Sheets-Sheet 1
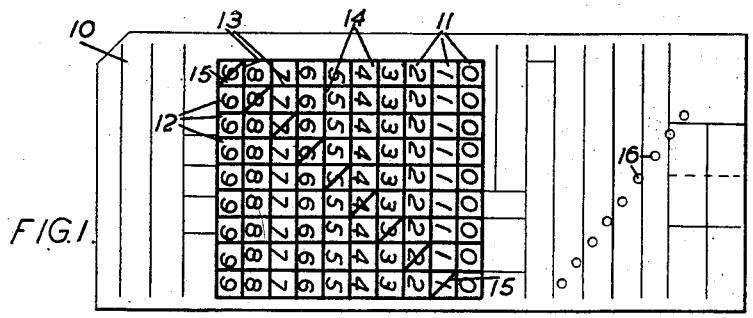
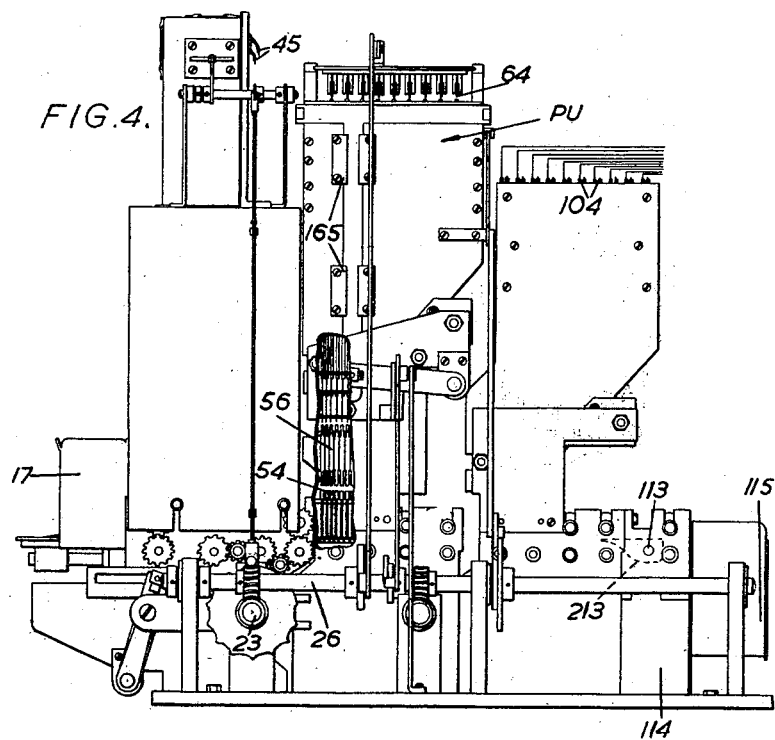
Inventor:
John Perrin,
By
Attorney

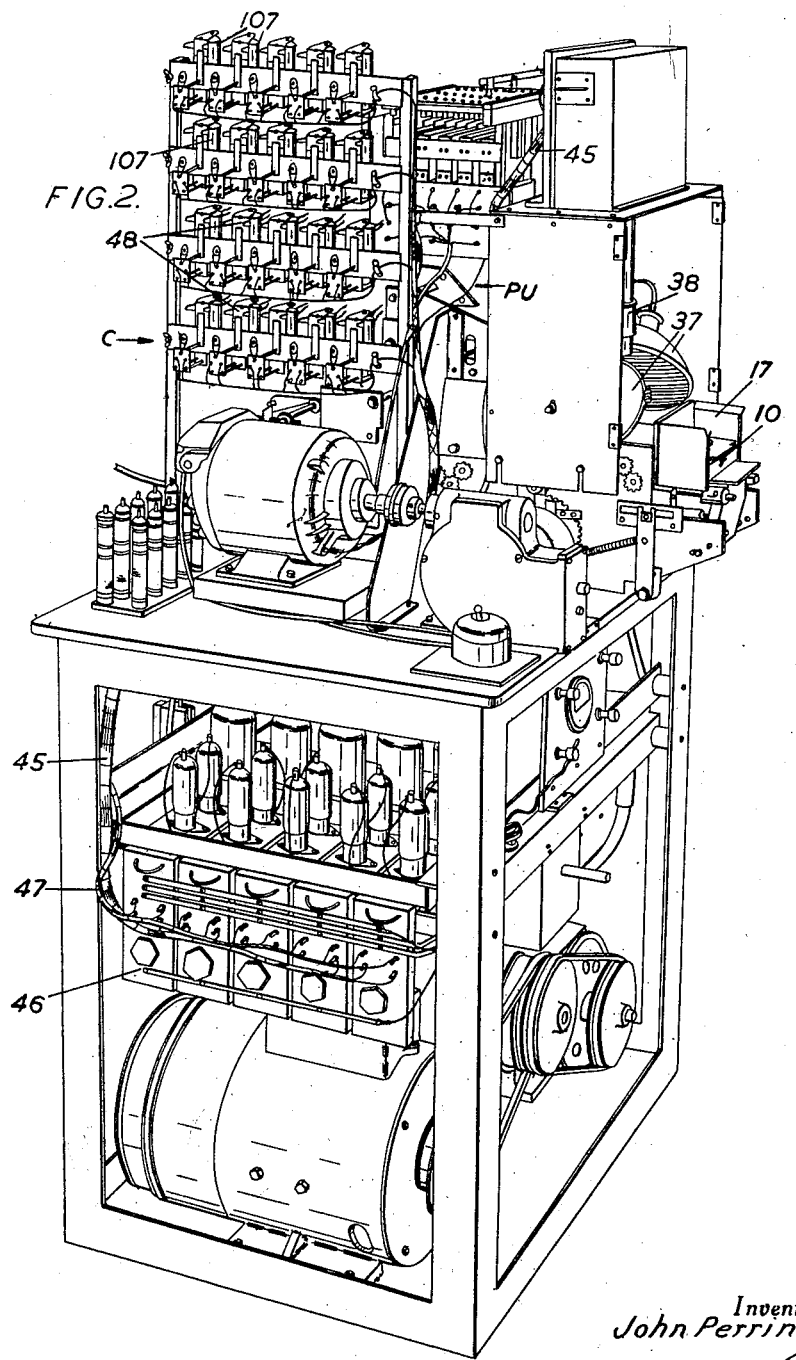

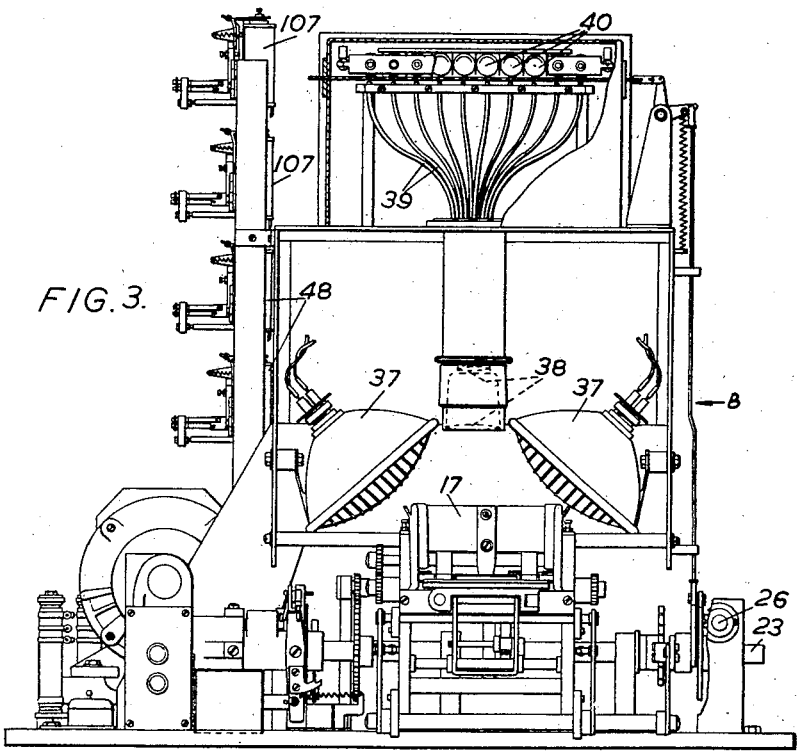

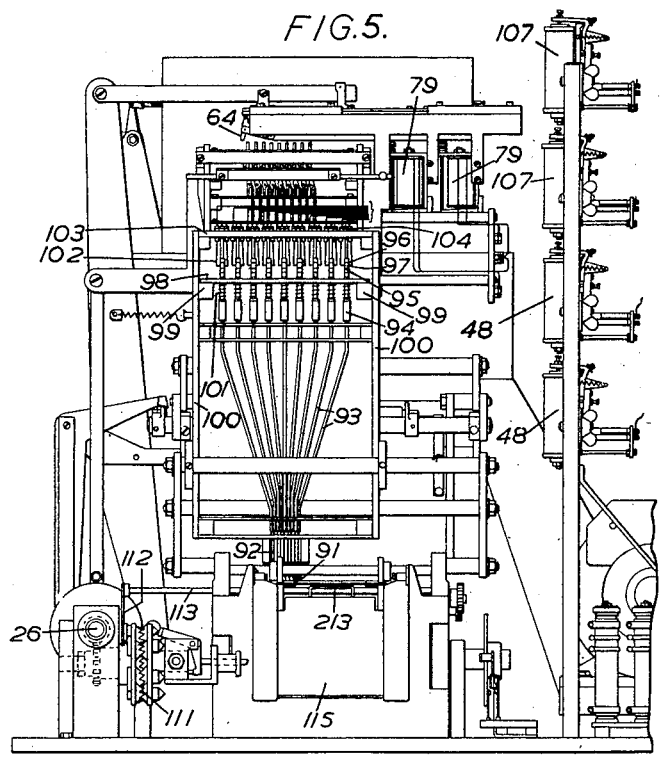

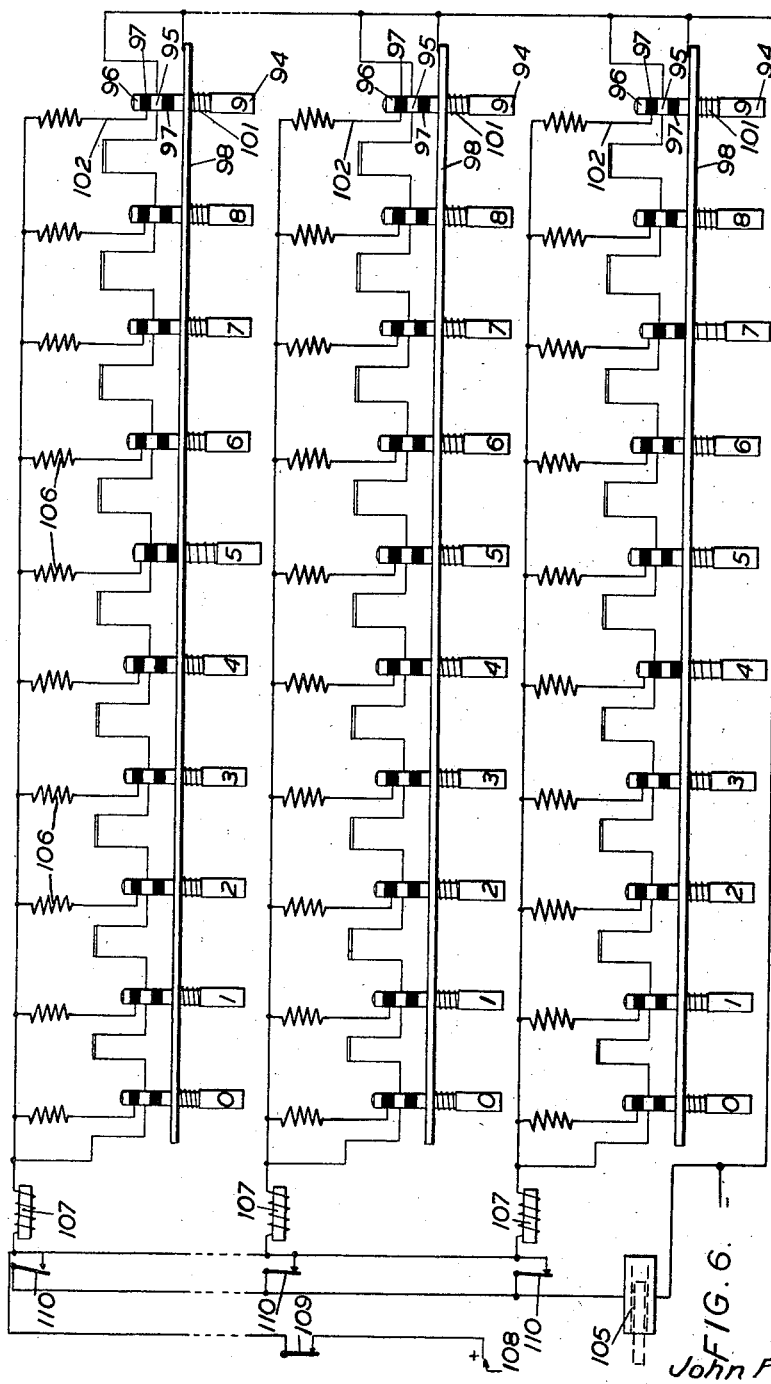

United States Patent Office 2,694,491
Patented Nov. 16, 1954

2,694,491

APPARATUS FOR SENSING DATA RECORDED ON STATISTICAL RECORDS

John Perrin, Croydon, England, assignor to Powers-Samas Accounting Machines Limited, London, England, a British company Original application May 9, 1951, Serial No. 225,307. Divided and this application May 16, 1952, Serial No. 288,264

Claims priority, application Great Britain May 17, 1950

3 Claims. (Cl. 209—110)

This invention relates to a machine for perforating statistical record cards and to apparatus for checking and segregating the perforated cards.

The present application is a division of my copending application Serial No. 225,307, filed May 9, 1951.

In my aforesaid co-pending application there is described a machine which senses data-indicating marks made on an imperforate record card and which has punches conditioned under control of the means for sensing said marks whereby a representation of the sensed data is recorded in the card by perforations made therein by the punches.

It is a main object of the present invention to provide means whereby the punched cards can be segregated into two groups one of which contains cards having one data-indicating perforation in each column of a predetermined field of the card and the other group contains cards having either no perforation in at least one column of the field or having at least two perforations in at least one column of the field.

According to the present invention apparatus for checking and segregating perforated statistical record cards comprises the combination with two card receiving pockets disposed one in advance of the other, a deflector normally to direct cards into a predetermined one of said pockets, and a timing device co-operating with the deflector to cause it to direct a card into the other of said pockets, of checking means to sense individual columns of a perforated card, electrical circuit means including a timing device actuator common to all the checking means, and an actuator control element for each card column to be checked, each said actuator control element causing operation of the common actuator on activation by the checking means co-operating therewith due to the checking means sensing that a card column contains either no perforation or at least two perforations.

In order that the invention may be more clearly understood an embodiment thereof will now be described, by way of example, with reference to the accompanying diagrammatic drawings in which:

Fig. 1 shows a card, marked and correctly punched,

Fig. 2 is a diagrammatic perspective view, looking from one side and one end, of a machine for scanning or sensing and for punching cards as illustrated in Fig. 1, Fig. 3 is an end elevation of the scanning or sensing apparatus embodied in the machine, Fig. 4 is a side elevation looking in the direction of arrow "B," Fig. 3, Fig. 5 is an end view looking in direction of arrow "C," Fig. 2, and Fig. 6 is a circuit diagram illustrating the manner of checking cards after they have passed the punching position.

Referring to Fig. 1 it will be observed that the record card 10 is of well known shape and is provided with data-indicating positions arranged in rows 11 and columns 12. On the card shown in Fig. 1 the columns extend lengthwise of the cards and the rows are vertical with respect thereto, this being in contradistinction to the arrangement usually employed on record cards. It will, however, be understood that if desired the columns and rows may be arranged in the manner more usually employed.

The record card is of a color such that light is reflected from the surface thereof and, as illustrated in Fig. 1, to the card is applied black, red or brown printing ink, or ink of other suitable color, to form lines 13 bounding and defining the data-indicating positions 14. It will be understood, therefore, that the data-indicating positions consist of small unobscured light-reflecting areas, each such area being so selected that it is capable of reflecting light of a predetermined intensity sufficient to actuate a given photo-electric cell. If desired, provided that a light-reflecting ink is used, a number or other identification character may be printed on a light-reflecting area of the card.

Data is recorded manually on the card by an operator It will be understood, therefore, that the data-indicating position, as indicated by marks 15, Fig. 1, by using a substantially non-light-reflecting media such as a black lead pencil, crayon or other marking instrument, or an instrument of other suitable marking color, so that the area of the data position capable of reflecting light is reduced.

In order that the cards so marked my be employed to control known forms of statistical machines, such, for example, as sorters or tabulators, the marked data is duplicated in the card by perforations 16, Fig. 1, located in rows and columns as is customary in the art, and this is effected by the machine described in the aforesaid application Serial No. 225,307.

Marked but unpunched cards are placed as a pile in a magazine 17 and are fed through the machine first to a mark sensing device and then to a punch unit PU which makes the perforations 16 in the card.

As fully described in the aforesaid application Serial No. 225,307, sensing is effected by lamps 37, Figs. 2 and 3, which direct light on a card in scanning position. Light striking the data-indicating positions is reflected upwards from the unobscured portions thereof to a lens system 38 which receives an image of the column being scanned and by which the reflected light is directed to the lower ends of plastic refractive elements 39 arranged to guide the reflected light to photo-electric cells 40 which on receipt of a light signal of predetermined magnitude are energised. If, however, a mark 15 is sensed the intensity of light reflected from the position 14 containing the mark is insufficient to cause functioning of the appropriate cell 40.

The cells 40 are connected by wires 45, Fig. 2, through an amplifier 46 and wires 47 one each to an electro-magnetic relay 48, the contacts of which are normally closed. The relays 48 transmit current to electro-magnets 79 which control fingers 64, Fig. 5, to effect setting of set-bars 56, Fig. 4, in the punch unit PU. The punch unit PU includes a card chamber, not shown, in which a card is located for punching when the chamber is raised to punches 54 which co-operate with the set-bars 56 and a die portion of the card chamber.

The card illustrated in Fig. 1 is provided with nine columns 12 and it is intended that one mark shall always be made in each column. Consequently when the card is punched there should be one perforation in each of nine corresponding columns of a predetermined field of the card. To check that there is one perforation in each of the nine columns in which punching is effected there is provided a checking device about to be described.

The punched card is moved out of the card chamber by feed rollers in the known manner and is delivered into a verticaly reciprocable sensing chamber 91, Fig. 5, which, in known manner, has sensing pins 92, and transmission rods 93 co-operating therewith. The sensing pins are arranged in columns corresponding to the columns of a card to be checked thereby and in each column of pins there is one pin corresponding to each data-indicating position in a card column. The upper end of each rod 93 supports a resistor controlling switch consisting of fixed elements 102 and a cylindrical contact element 94 comprising an integral conductor element 96 and a shorting ring 95 insulated from elements 94 and 96 by an insulating bush, not shown, the ring 95 and element 96 having their contact faces separated by contiguous insulator ring elements 97.

The contact elements 94 pass through a conductor plate 98 suported by insulating elements 99 carried by side frames 100 and are urged towards the rods 93 by springs 101. The fixed contact elements 102 comprise leaf springs which depend from a plate 103 formed from insulating material, the plate 103 being supported by the frames 100. The upper ends of the contacts 102 are provided with terminals 104 while the lower ends of the contacts normally engage the insulator elements 97.

The terminals 104 are connected with a timing device actuator comprising a solenoid 105, Fig. 6, through resistors 106 and the contacts of relays 107 which constitute actuator control elements. As can be seen from Fig. 6, the electrical circuit is a self-contained circuit fed from a source 108. The circuit is closed by a control switch 109, Fig. 6, operated when the sensing chamber 91 is in its raised position.

It will be understood that the circuit includes a column of elements 94 for each card column to be sensed but in Fig. 6 only three columns have been shown to illustrate the three conditions which can occur as the result of a checking operation. In the upper column, Fig. 6, it will be seen that a hole has been sensed in the No. 5 position thus indicating that only one hole is punched in that column of the card. This places the appropriate resistor 106 in series with the relay 107 so that the potential applied thereto is insufficient to close relay switch contact 110 and the solenoid 105 is not energized.

In the center column no holes have been sensed in the card, none of the resistors 106 is in circuit and the full potential passes along the line connecting rings 97 to close the relay switch contact 110 and energize solenoid 105.

In the lower column two holes representing Nos. 4 and 7 have been sensed thus placing two resistors 106 in parallel thereby halving the resistance so that again the potential to relay 107 is sufficient to close the relay switch contact 110 and energize solenoid 105.

The solenoid 105 actuates a rotatable timing device 111, Fig. 5, of known construction, driven by a shaft 26 which, in turn, is driven by the main shaft 23, Fig. 4, of the machine. The construction and mode of operation of the timing device is as described in United States patent specification No. 2,034,010 and the timing device actuates a lever 112 secured to a spindle 113, Figs. 4 and 5, on which is mounted a deflector 213 disposed above a reject receiver pocket 114. When the testing device determines that there is one perforation in each of the nine sensed columns the deflector 213 is in its horizontal position and the card on being released from the sensing chamber 91 is fed over the deflector and is delivered into a receiver pocket 115. If, however, the testing device determines that in one or more of the sensed columns there is no hole, or that there is more than one hole, the solenoid 105 operates the timing device 111 so that the deflector 213 is raised and deflects the defective card into the reject receiver 114.

I claim:

1. Apparatus for checking and segregating perforated statistical record cards comprising the combination with two card-receiving pockets disposed one in advance of the other, a deflector normally to direct cards into a predetermined one of said pockets, and a timing device cooperating with the deflector to cause it to direct a card into the other of said pockets, of a row of independently axially movable sensing pins for each card column to be checked, a solenoid to control operation of said timing device, an electrical circuit including said solenoid, a relay for each said row and in said circuit with said solenoid when energized to control operation thereof, a plurality of switches in said circuit and arranged one for each sensing pin in rows corresponding to said sensing pins with the switches of each row connected with the relay appropriate to that row and with each of said switches operatively connected with and operable by its respective sensing pin to control operation of the relay appropriated to that row, and a normally open control switch in said electrical circuit and arranged to be closed during sensing of a card by said pins.

2. Apparatus for checking and segregating perforated statistical record cards comprising the combination with two card-receiving pockets disposed one in advance of the other, a deflector normally to direct cards into a predetermined one of said pockets, and a timing device co-operating with the deflector to cause it to direct a card into the other of said pockets, of a row of independently axially movable sensing pins for each card column to be checked, a solenoid to control operation of said timing device, and an electrical circuit connected with said solenoid to control operation of said solenoid, said electrical circuit including a normally open control switch arranged to be closed during sensing of a card by said pins, for each row of sensing pins a relay conected with said switch to effect activation of said solenoid when energized during each sensing operation except when a single perforation is sensed by a pin of the row, for each sensing pin of each row a resistor connected with the relay for that row, and for each row of pins a plurality of resistor controlling switches, one for each sensing pin, normally connecting the resistors of the row in parallel, each said resistor controlling switch being movable by its sensing pin on detection thereby of no perforation in a card to short circuit the resistor controlled thereby.

3. Apparatus according to claim 2, wherein the resistor controlling switches for a row of sensing pins co-operate with a conductor plate common thereto and each said switch comprises a cylindrical contact element operatively connected with the respective sensing pin and in electrical contact with and slidable axially relative to said conductor plate, a conductor element integral with and extending axially of said contact element, a shorting ring surrounding said contact, and means insulating said shorting ring from said contact and conductor elements.

References Cited in the file of this patent

UNITED STATES PATENTS

| Number | Name | Date |
| --- | --- | --- |
| 1,449,078 | Whittlesey | Mar. 20, 1923 |
| 2,048,397 | Lasker | July 21, 1936 |
| 2,076,730 | Kolm | Apr. 13, 1937 |